United States Patent
Li et al.

(10) Patent No.: US 10,499,444 B2
(45) Date of Patent: Dec. 3, 2019

(54) RADIO NETWORK ACCESS OF WEARABLE DEVICES

(71) Applicant: Intel IP Corporation, Santa Clara, CA (US)

(72) Inventors: Qian Li, Beaverton, OR (US); Apostolos Papathanassiou, Campbell, CA (US); Lili Wei, Hillsboro, OR (US); Geng Wu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/749,728

(22) PCT Filed: Dec. 18, 2015

(86) PCT No.: PCT/US2015/066666
§ 371 (c)(1),
(2) Date: Feb. 1, 2018

(87) PCT Pub. No.: WO2017/044143
PCT Pub. Date: Mar. 16, 2017

(65) Prior Publication Data
US 2018/0213582 A1 Jul. 26, 2018

Related U.S. Application Data (60) Provisional application No. 62/217,635, filed on Sep. 11, 2015.

(51) Int. Cl.
*H04W 76/14* (2018.01)
*H04W 88/06* (2009.01)
(Continued)

(52) U.S. Cl.
CPC ........... *H04W 76/14* (2018.02); *H04W 8/005* (2013.01); *H04W 48/08* (2013.01);
(Continued)

(58) Field of Classification Search
CPC ..... H04W 8/005; H04W 48/08; H04W 56/00; H04W 56/001; H04W 72/0406;
(Continued)

(56) References Cited

U.S. PATENT DOCUMENTS

2005/0113022 A1  5/2005  Pearson
2010/0167743 A1  7/2010  Palanki et al.
(Continued)

FOREIGN PATENT DOCUMENTS

EP             1328093 A1    7/2003
WO    WO-2017044143 A1       3/2017

OTHER PUBLICATIONS

"International Application Serial No. PCT/US2015/066666, International Search Report dated Jun. 29, 2016", 3 pgs.
(Continued)

*Primary Examiner* — Dominic E Rego
(74) *Attorney, Agent, or Firm* — Schwegman Lundberg & Woessner, P.A.

(57) ABSTRACT

An apparatus of user equipment (UE), the apparatus comprises transceiver circuitry and processing circuitry. The transceiver circuitry is configured to transmit and receive radio frequency electrical signals to communicate with one or more separate devices via a cellular communication network as UE and to communicate with one or more separate devices via a wireless personal area network (PAN) as PAN header UE (hUE). The processing circuitry is configured to receive a packetized message directly from a second UE via the PAN, wherein the packetized message indicates an enhanced node B (eNB) of the cellular network as a destination for the packetized message; and initiate transmission of the packetized message to the eNB.

22 Claims, 7 Drawing Sheets

(51) Int. Cl.
  *H04W 48/08* (2009.01)
  *H04W 76/10* (2018.01)
  *H04W 84/18* (2009.01)
  *H04W 8/00* (2009.01)
  *H04W 56/00* (2009.01)
  *H04W 72/04* (2009.01)
  *H04L 1/00* (2006.01)
  *H04W 88/04* (2009.01)

(52) U.S. Cl.
  CPC ..... *H04W 56/001* (2013.01); *H04W 72/0406* (2013.01); *H04W 76/10* (2018.02); *H04W 88/06* (2013.01); *H04L 1/0026* (2013.01); *H04W 56/00* (2013.01); *H04W 84/18* (2013.01); *H04W 88/04* (2013.01)

(58) Field of Classification Search
  CPC ..... H04W 76/10; H04W 76/14; H04W 84/18; H04W 88/04; H04W 88/06; H04L 1/0026
  See application file for complete search history.

(56) References Cited

U.S. PATENT DOCUMENTS

| | | | | |
|---|---|---|---|---|
| 2010/0167768 A1* | 7/2010 | Tsutsui | ............... | H04B 7/15542 455/500 |
| 2010/0261479 A1* | 10/2010 | Hidaka | ................... | H04L 45/12 455/445 |
| 2012/0307717 A1* | 12/2012 | Worrall | ............... | H04B 7/15557 370/315 |
| 2012/0327883 A1* | 12/2012 | Yang | ..................... | H04L 1/0026 370/329 |
| 2013/0034059 A1* | 2/2013 | Lee | ..................... | H04W 74/006 370/328 |
| 2013/0121337 A1 | 5/2013 | Nguyen et al. | | |
| 2013/0322324 A1* | 12/2013 | Kim | ................. | H04W 36/0077 370/315 |
| 2014/0328329 A1* | 11/2014 | Novlan | ............... | H04W 72/042 370/336 |
| 2014/0355483 A1* | 12/2014 | Jang | ........................ | H04W 4/70 370/254 |
| 2015/0023281 A1* | 1/2015 | Wu | ................... | H04W 72/0473 370/329 |
| 2015/0078256 A1 | 3/2015 | Van Wyk | | |
| 2015/0087921 A1* | 3/2015 | Felix | ................... | A61B 5/04087 600/301 |
| 2015/0156760 A1* | 6/2015 | Yu | ........................ | H04W 72/042 370/330 |
| 2016/0058375 A1* | 3/2016 | Rothkopf | .............. | G06F 1/1643 600/301 |
| 2016/0063850 A1* | 3/2016 | Yang | ..................... | G08B 23/00 340/539.22 |

OTHER PUBLICATIONS

"International Application Serial No. PCT/US2015/066666, Written Opinion dated Jun. 29, 2016", 10 pgs.

* cited by examiner

RADIO NETWORK ACCESS OF WEARABLE DEVICES

PRIORITY APPLICATION

This application is a U.S. National Stage Application under 35 U.S.C. 371 from International Application No. PCT/US2015/066666, filed Dec. 18, 2015, published as WO 2017/044143, which claims the benefit of priority to U.S. Provisional Application Ser. No. 62/217,635, filed Sep. 11, 2015, all which are incorporated herein by reference in their entireties.

TECHNICAL FIELD

Embodiments pertain to transmitting packetized data using radio access networks. Some embodiments relate to communicating cellular network data using wearable user equipment.

BACKGROUND

Radio access networks are used for delivering one or more of data communications, voice communications, and video communications to user equipment such as a cellular telephone or a smart phone. Some radio networks are packet switched networks and packetize information such as voice and video data when it is sent over the network. Demand for communicating voice and video is increasing, and the types of devices used for communicating is becoming more diverse. It is a challenge to maintain quality of service in communications that involve devices of decreasing size and battery capacity. Thus, there are general needs for devices, systems and methods that provide a robust protocol for communication with user equipment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
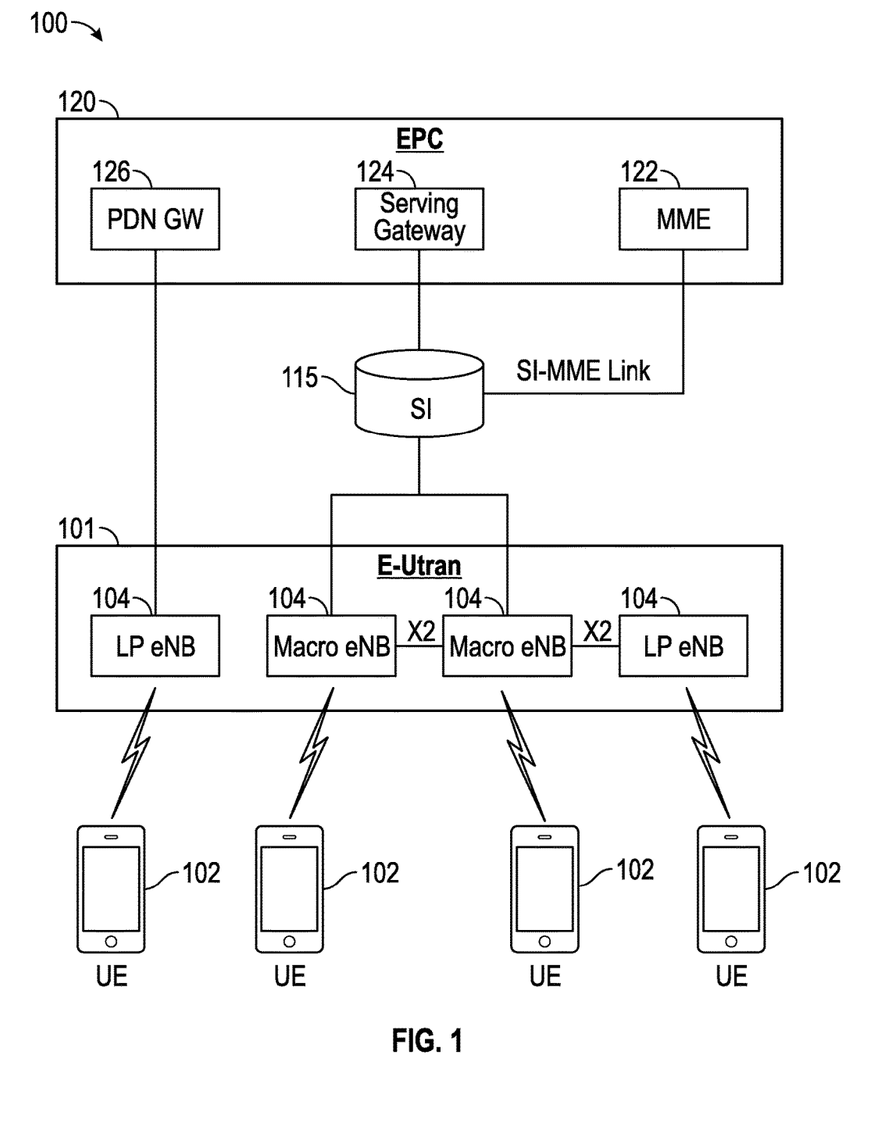
FIG. 1 is an example of a portion of an end-to-end network architecture of a long term evolution (LTE) network with various components of the network in accordance with some embodiments.

FIG. 1 shows an example of a portion of an end-to-end network architecture of a third generation partnership project (3GPP) long term evolution (LTE) cellular network with various components of the network in accordance with some embodiments. The network 100 comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102.

The MME 122 is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. The S1 is split into two parts: the S1-U, which carries traffic data between the eNBs 104 and the serving GW 124, and the S1-MME, which is a signaling interface between the eNBs 104 and the MME 122. The S11 interface is the interface between the serving GW and the MME 122. The S5 or S8 interface is the interface between the serving GW 124 and the PDN GW 126. The X2 interface is the interface between eNBs 104. The X2 interface comprises two parts, the X2-C and X2-U. The X2-C is the control plane interface between the eNBs 104, while the X2-U is the user plane interface between the eNBs 104.

The UEs 102 may include physical layer (PHY) circuitry for transmitting and receiving signals to and from eNBs. The UEs 102 may also include medium access control layer (MAC) circuitry for controlling access to the wireless medium. The UEs 102 communicate with the eNBs according to a radio protocol. A UE 102 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. A UE may include one or more of a keyboard, a display, a non-volatile memory port, multiple antennas, a graphics processor, an application processor, speakers, and other mobile device elements. The display may be an LCD screen including a touch screen.

Figure 2:
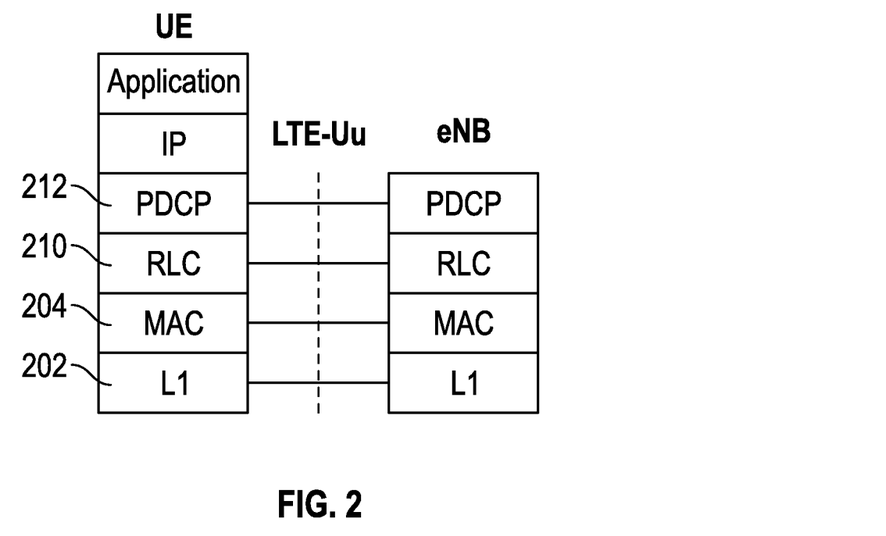
FIG. 2 is diagram of an example of a cellular u-plane protocol stack in accordance with some embodiments.

FIG. 2 is diagram of an example embodiment of a cellular u-plane protocol stack. The layers of the protocol stack include a packet data convergence protocol (PDCP) layer 208, a radio link control (RLC) protocol layer 206, a MAC protocol layer 204, and a PHY layer 202 or layer 1 (L1). IP packets are processed from the top layer to the bottom layer of the protocol stack. Information processed using the layers may be passed to a physical or PHY layer for transmission. In the EPC 120 of FIG. 1, packets are encapsulated in a specific EPC protocol and tunneled between the PDN GW 126 and the eNBs 104. A general packet radio service (GPRS) tunneling protocol (GTP) may be used on the S1 interface between the eNBs 104 and the serving GW 124, and may also be used on the S5/8 interface between the PDN GW 126 and the serving GW 124. Different protocols may be used depending on the interface.

Wearable communication devices may become the next generation main stream personal electronic devices. The size of wearable devices is typically smaller than most hand-held devices, such as a smartphones, tablet personal computers, and the like (referred to herein as "smart user equipment," "smart UE," "smart device," etc.), and the smaller size can lead to smaller components. The reduction in component size may lead to reduced battery capacity, memory size, computation capability, communication capability, etc. Also, the applications and requirements of wearable devices may also be more diverse than hand-held smart devices.

Some use case examples for wearable devices include one or both of file transfer and video streaming between wearable devices and the network, between wearable devices and handheld devices, and between wearable devices. Another use case example includes computation sharing and memory sharing among wearable devices or computation sharing and memory sharing among wearable devices and handheld devices. Other use case examples include health monitoring and alerts, environment monitor and alerts, and uploading of sensor data to the cloud. Some examples of types of network traffic useful in the use case applications include large packet transfers, constant data streaming, bursty large packet transfers requiring low latency immediate transmission, bursty small packet mission critical transfers, and regular small packet transfers.

A challenge pertaining to developing communication solutions for wearable devices is to meet the stringent energy consumption constraints, while supporting the diverse traffic types and quality of service (QoS) requirements, especially for a densely populated scenario.

Most of the legacy wearable devices use the Bluetooth (BT) protocol as the connectivity solution. Despite the relatively good energy efficiency of BT, the BT connection setup (pairing procedures between devices) may take a relatively long time and the supported data rate is relatively low. Such drawbacks may make it hard to meet the latency and data rate requirements of future wearable devices. Legacy long term evolution (LTE) or wireless local area network (WLAN) systems are able to support high data rates, but energy efficiency is given less attention or is only considered in specific use cases, such as machine type communication (MTC) with relatively small packet transmissions.

Therefore, a new design for wearable device connectivity would be useful to achieve spectrum and energy efficiencies for massive wearable device connectivity, diverse traffic types and maintain QoS requirements in a densely populated environment.

Example embodiments are directed towards communication between the infrastructure network and one or more wearable devices in at least one scenario where each person or user has both a smart UE (with cellular network connection) as well as one or more wearable devices as UE. According to at least one example embodiment, a personal area network (PAN) may be formed using the smart UE as the PAN header UE to assist the communication between the one or more wearable UEs and the infrastructure network. For the sake of brevity, the wearable user equipment may be referred to as "wUE," and the PAN header UE may be denoted as an "hUE." In certain examples, the wUE may be worn on the wrist as a watch or may be worn as eyeglasses. In other examples, the wUE can be incorporated into an article of clothing. The hUEs may include additional features and may perform signaling to support one or more PAN operations as compared to the typical UEs operating in standalone mode. Example embodiments may define new device categories for the UEs that can support PAN operations as a header UE and UEs that can only operate in non-standalone mode as a member of the PAN.

Figure 3:
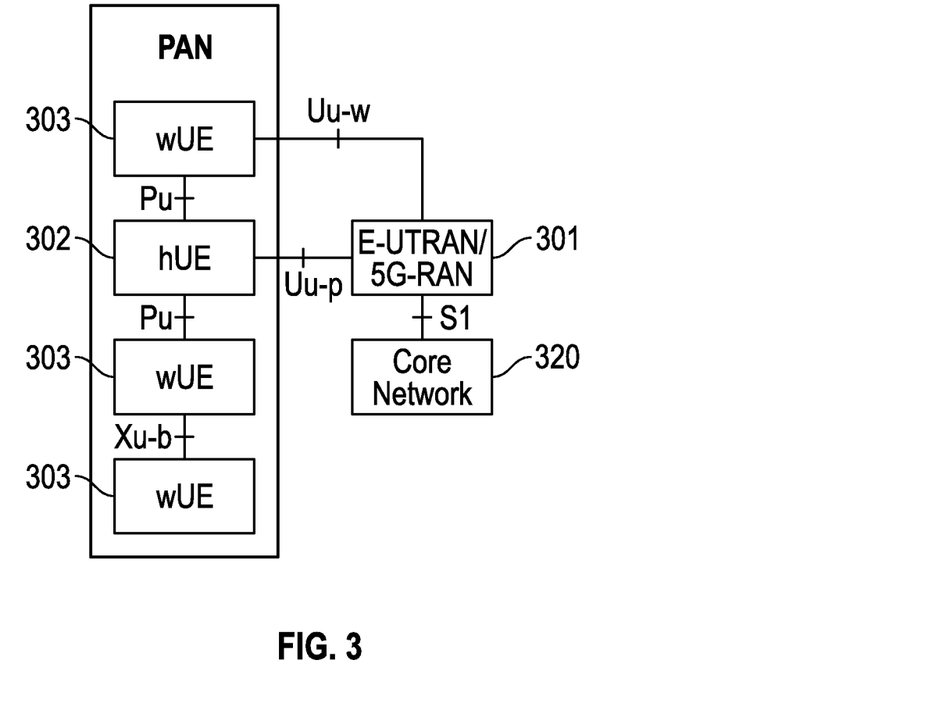
FIG. 3 shows an example system architecture in accordance with some embodiments.

FIG. 3 shows an example system architecture according to various example embodiments. The system includes a first UE as an hUE 302 and one or more second UEs as wUEs 303 that form a PAN that may connect with a RAN 301. As shown FIG. 3, the RAN 301 may be a fifth generation RAN (5G-RAN) or a EUTRAN. The core network may an EPC 320 such as the example EPC described in FIG. 1. The PAN connects with the RAN 310 via two interfaces: a Uu-w interface and a Uu-p interface. As shown in FIG. 3, the Uu-p interface can be an interface between the hUE and the RAN 301, and the Uu-w interface can be an interface between the wUE and the RAN 301. The Uu-p interface may be obtained by starting with the interface between a typical UE and the RAN (for example, a Uu interface in LTE) as the basis for the Uu-p interface and adding the signaling support for PAN operation. In some embodiments, the Uu-w interface may only provide part of the downlink functionalities. Within the PAN, communication among the hUE and the wUEs are defined by the interface Pu. In some embodiments, communication between wUEs is defined by the interface Xu-b.

Figure 4:
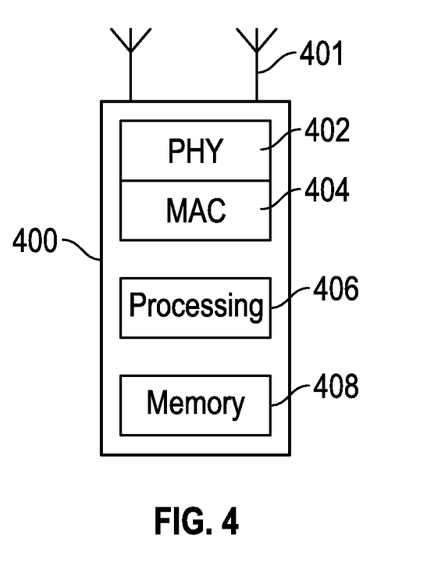
FIG. 4 illustrates an example of a functional block diagram of a personal area network header user equipment (hUE) in accordance with some embodiments.

FIG. 4 illustrates an example embodiment of a functional block diagram of an hUE. The hUE 400 may be suitable for use as any one or more of the UEs 102 illustrated in FIG. 1 or the hUE 302 in FIG. 3. The hUE 400 may include PHY circuitry 402 that includes transceiver circuitry for transmitting and receiving radio frequency electrical signals to and from one or more nodes of a radio access network (e.g., eNBs 104 of FIG. 1) using one or more antennas 401 electrically coupled to the PHY circuitry 402. The hUE 400 may communicate with one or more separate devices via a cellular communication network as UE. The transceiver circuitry of the hUE 400 also communicates with one or more separate devices via a wireless personal area network (PAN) and may have the role of the PAN header device in the PAN. In some embodiments, the transceiver circuitry communicates with devices in the PAN over a range less than ten meters, and communicates via the PAN using a PAN frequency band different from a frequency band of the cellular network.

The PHY circuitry 402 may include circuitry for modulation/demodulation, upconversion/downconversion, filtering, amplification, etc. The hUE 400 may also include medium access control layer (MAC) circuitry 404 for controlling access to the wireless medium and to configure frames or packets for communicating over the wireless medium. The hUE 400 may also include processing circuitry 406 and memory 408 arranged to configure the various elements of the UE to perform the operations described herein. The memory 408 may be used to store information for configuring the processing circuitry 406 to perform the operations.

The one or more antennas 401 utilized by the hUE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the hUE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Figure 5:
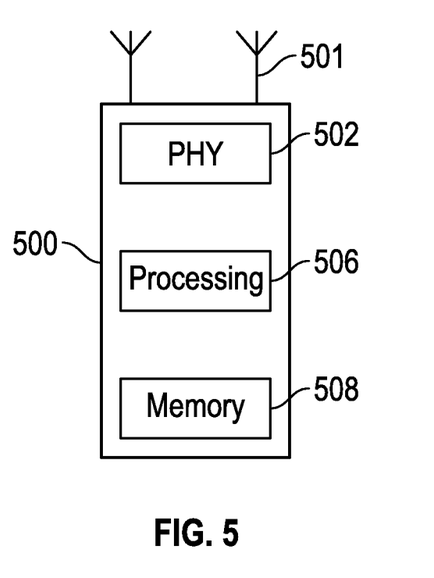
FIG. 5 illustrates an example of a functional block diagram of wearable user equipment (wUE) in accordance with some embodiments.

FIG. 5 illustrates an example embodiment of a functional block diagram of a wUE 500. The wUE 500 may include PHY circuitry 502 that includes transceiver circuitry for receiving radio frequency electrical signals from a base station of a radio access network (e.g., ab eNB 104 of FIG. 1) using one or more antennas 501 electrically coupled to the PHY circuitry 502. The transceiver circuitry of the wUE 500 also communicates directly via a wireless personal area network (PAN) with a separate PAN header UE (hUE) and may also communicate with one or more other wUEs via the PAN. The wUE 500 may also include processing circuitry 506 and memory 508 arranged to configure the various elements of the UE to perform the operations described herein. The wUE 500 may also include one or more layers of a UE protocol stack in the example embodiment of FIG. 2.

For the data channel between the wUE and a network base station (BS), the link can be enabled alongside the hUE assisted relay link depending on the traffic and data rate requirements. In some embodiments, the uplink data traffic from the wUE may be kept at the hUE regardless of whether or not the direct link is enabled. Depending on whether the wUE needs to receive data from the BS and depending on which resource the intra-PAN communication uses, the wUE may need to keep track of multiple timings requirements or other like timing information.

Figure 6:
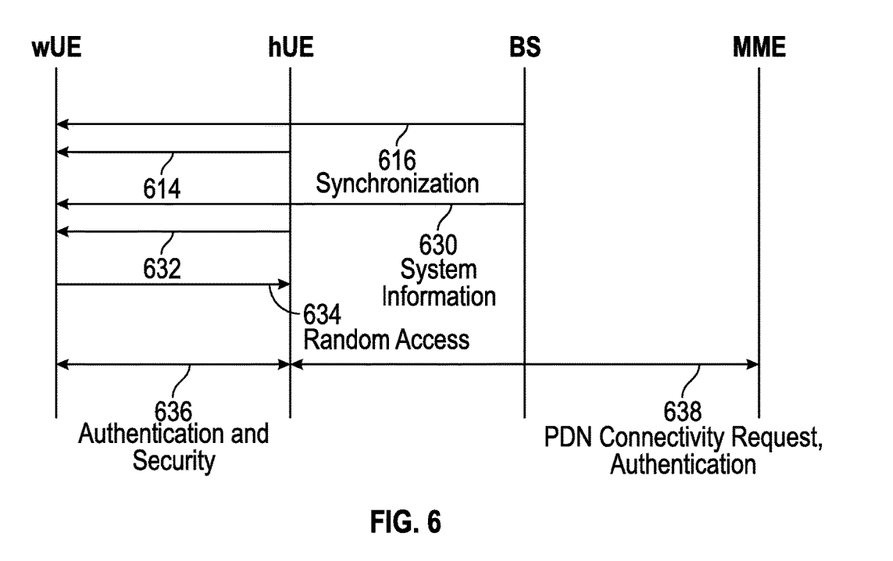
FIG. 6 is a diagram of an example embodiment of a communication protocol for the radio access procedure of a wUE in accordance with some embodiments.

FIG. 6 is a diagram of an example embodiment of a communication protocol for the radio access procedure of a wUE. The transceiver circuitry of the wUE may detect one or both of a downlink synchronization signal 614 transmitted by the hUE and a downlink synchronization signal 616 transmitted by a BS in order to synchronize to the cellular network.

Figure 7:
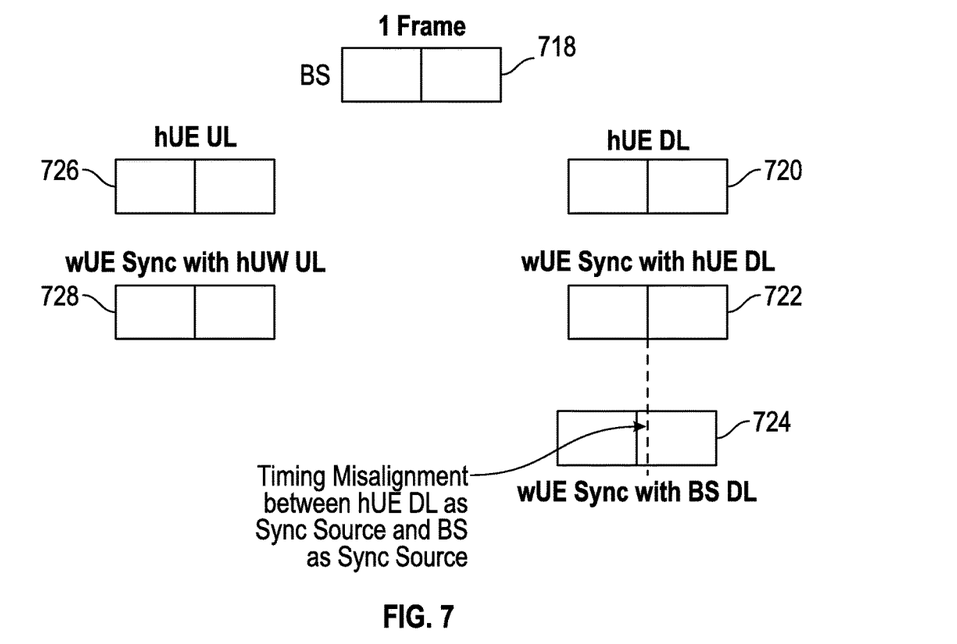
FIG. 7 illustrates an example of timing options for synchronizing a wUE with other devices of the radio access network (RAN) in accordance with some embodiments.

FIG. 7 illustrates an example embodiment of timing options for synchronizing a wUE with other devices of the RAN. In the embodiment, it is assumed that the intra-PAN communication operates in a synchronized mode using the timing of the cellular network as a reference. FIG. 7 includes representations of base station timing 718 and hUE downlink (DL) timing 720. If a DL resource of the cellular network is allocated for the intra-PAN DL communication, and the propagation time difference from the BS to the hUE and the wUE is relatively small (e.g., within cyclic prefix (CP) duration), the wUE can use the hUE DL timing as a single synchronization source to synchronize the wUE communications with the PAN and the wUE communication with the cellular network, as represented by wUE downlink timing 722.

If a DL resource of the cellular network is allocated for the intra-PAN DL communication, and the propagation time difference from the BS to the hUE and the wUE is larger and cannot be absorbed by the CP, the wUE may use the hUE DL timing as the synchronization source for intra-PAN communication with the hUE and other wUEs (as represented by wUE DL timing 722), and may use the BS timing as the synchronization source for downlink communication with the BS (as represented by wUE DL timing 724).

FIG. 7 also includes a representation of hUE uplink (UL) timing 726. If a UL resource of the cellular network is allocated for the intra-PAN DL communication, the wUE may use the hUE UL timing 726 as the synchronization source for intra-PAN communication with the hUE and other wUEs (as represented by wUE UL timing 728), and use BS timing as the synchronization source for downlink communication with the BS.

Returning to FIG. 6, after synchronization the wUE may detect and decode system information 630 broadcasting from the BS and detect and decode system information 632 broadcasting from the hUE. After determining the broadcast system information, the processing circuitry of the wUE may perform random access (RA) to the hUE by initiating transmission of a random access message to the hUE at 634 via the PAN. The transceiver circuitry of the hUE detects and decodes the random access message received over the PAN, and transmits a random access response message (RARM) to the wUE via the PAN. The random access response message includes one or both of a cell radio network temporary identifier (C-RNTI) of the hUE and an identifier for the PAN (PAN-ID).

The hUE may authenticate the wUE access to the PAN at 636 and may establish a secure PAN connection for the wUE with the hUE. The hUE may also register the wUE in the infrastructure network, and if needed, setup dedicated bearers. In some embodiments, at 638 the hUE may register the wUE with a mobility management entity (MME) and establish a packet data network (PDN) connection.

Figure 8A:
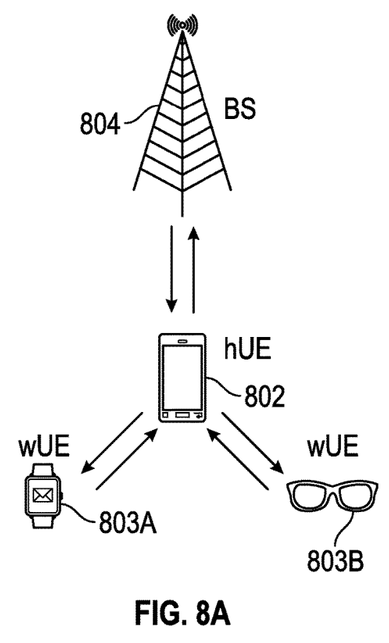
FIGS. 8A and 8B are illustrations of example communication modes involving wUEs, hUE, and a network base station in accordance with some embodiments.
Figure 8B:
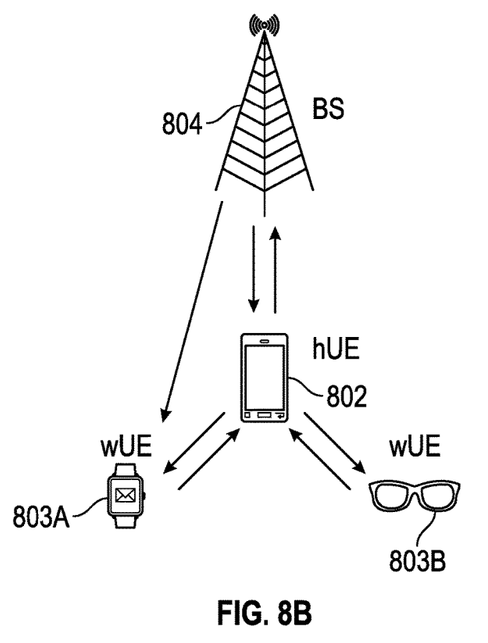

FIGS. 8A and 8B are illustrations of example embodiments of communication modes involving wUEs 803A and 803B, hUE 802, and a base station (BS) 804, such as an eNB for example. In various embodiments, the PAN of the wUE and hUE can appear to the cellular network as a single device with a single network ID. In some embodiments, the network ID can be a cellular temporary network identifier (C-RNTI) of the hUE or a PAN-ID acquired during a RA procedure. The C-RNTI or the PAN-ID can be broadcast by the hUE to the wUEs in the system information of the PAN. The hUE may manage the control-plane signaling, the user-plane traffic between wUE and the BS, and the user-plane traffic among the wUEs.

In FIG. 8A, all communication between a wUE and the BS 804 goes through the hUE 802. In some embodiments, a wUE may only communicate with the hUE in both DL and UL. The hUE may receive a packetized message directly from the wUE via the PAN, and the packetized message indicates the BS of the cellular network as the destination for the packetized message. The processing circuitry of the hUE then initiates transmission of the packetized message to the BS. Packetized messages from the BS for the wUE are received by the hUE and are forwarded to the wUE.

The wUEs 803A, 803B may need to have their own C-RNTI and the wUE can be addressed by other methods. In some embodiments, a wUE is addressed using a bearer ID. In the embodiments, the bearers allocated to the PAN may need to be wUE specified, i.e., no bearer sharing among the wUEs. For wUEs with independent international mobile subscriber identifier (IMSI), the hUE can be involved in establishing the default bearers for each of the wUEs during the initial attach procedure, and in adding dedicated bearers for each of the wUEs if new traffic flows need to be added. For wUEs without an independent IMSI, the bearers may need to be setup as the bearers of hUE. This operation may require extending the number of the bearers for the PAN header category to be more than 8. Also, more than one bearer may be needed to be setup for each access point name (APN). Benefits of using a bearer ID to address the wUEs include relatively low relay latency and potential support for amplify-and-forward (AF) relay.

In some embodiments, the wUE is addressed by internet protocol (IP) port number. In the embodiments, each wUE may be associated with one IP port number in the hUE IP address. Benefits of using IP port number to address the wUEs include bearer sharing among wUEs, support wUEs without an independent IMSI.

FIG. 8B is an example embodiment of a rate enhanced PAN communication mode for wUEs that experiences a relatively high rate of data traffic. In this communication mode, both the hUE and a wUE can receive data from the BS transmission in the same frequency resource at the same time. Due to the shared C-RNTI (or PAN-ID) among the devices in the PAN, the hUE and the wUE can both decode the BS transmission addressed to the C-RNTI or the PAN-ID. However, for wUEs with relatively stringent power constraints, it may be more power efficient to specify the resource block that the wUE may decode for its own data (instead of decoding all the data to multiple devices in the PAN).

Figure 9:
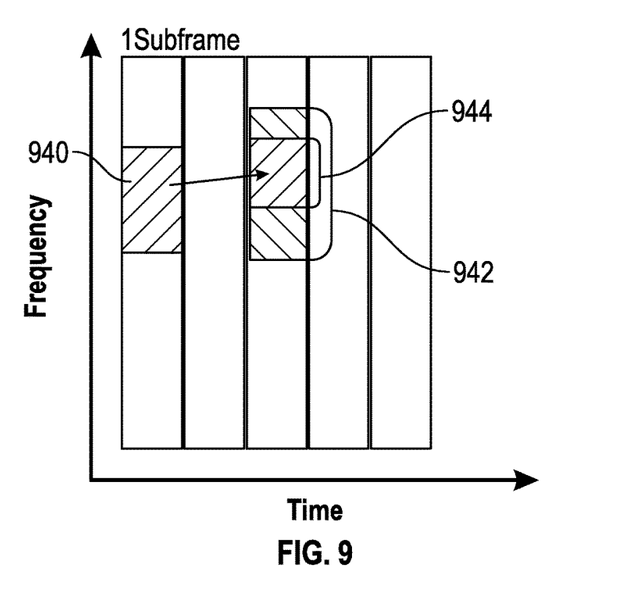
FIG. 9 illustrates an example of allocating resources according to devices within the personal area network in accordance with some embodiments.

FIG. 9 illustrates an example embodiment of allocating resources according to devices within the PAN. In some embodiments, a subgroup ID (or antenna port ID) is defined for addressing hUE and wUEs of a specific group of the PAN under the same C-RNTI. As compared to acquiring new C-RNTI for addressing the sub-group, this approach bypasses the RA procedure, and therefore may have lower latency and may reduce collisions. As shown in the example embodiment of FIG. 9, the physical control information 940 of the PAN is included in a first subframe and physical data of the PAN 942 is included in a second subframe. The physical data of the subgroup 944 is included in the subframe of the physical data of the PAN. The subgroup ID number can be dynamically assigned upon request from the hUE. The data to the subgroup can be scheduled in an independent physical resource. This avoids mixing the data traffic to the subgroup and to other devices in the PAN.

Once a DL packet is received by the PAN from a BS, a hybrid automatic repeat request (HARQ) message may be sent to the BS from the hUE (referred to as a "hUE HARQ"). Additionally, a feedback HARQ message may be sent to the hUE from the wUE (referred to as a "wUE HARQ"). If the wUE HARQ includes a negative acknowledgement (NACK) to the hUE, the hUE may perform a retransmission to the wUE. This scheme may allow a natural path selection between the direct link and the relay link.

The wUE can also measure the channel quality of the direction link from BS and report a Channel Quality Indicator (CQI) to the hUE. The CQIs may indicate channel quality of the BS-to-hUE link and channel quality of at least one of the hUE-to-wUE link and the BS-to-wUE link. The reporting interval can be adjusted as desired. In the case where the BS-to-hUE link and the BS-wUE are highly correlated, the CQI reporting from the wUE to the hUE can be less frequent. In the case where the BS-hUE link and the BS-wUE are less correlated, the CQI reporting from the wUE to the hUE can be more frequent. Based on the CQI reporting from the hUE and its measured channel condition of the BS-hUE link, the hUE may send a CQI to the BS for the BS to schedule transmissions. For feedback CQIs for BS scheduling, the processing circuitry of the hUE may need to choose the CQI value to match the BS-to-hUE link throughput and the PAN throughput, in order to minimize traffic overflow at the hUE.

According to some embodiments, for wUEs that need low latency transmission, a PHY layer or layer 1 (L1) amplify-and-forward (AF) relay can be implemented at the hUE. The L1 AF may amplify a received signal and forward that signal to another node (e.g., from the hUE to the BS). The L1 AF may also be referred to as a "repeater." The data to the wUE may need to be put in separate resource as in the rate-enhanced operation mode. In some embodiments, when the processing circuitry of the hUE decodes a message detected on a first resource of the cellular network indicating the wUE as a destination, the processing circuitry may initiate retransmission of information included in the message to the wUE using a second resource. As compared to the default operation mode, the complexity of implementing rate-enhanced PAN communication and the AF-based forwarding may be more complicated in terms signaling overhead, scheduler complexity, etc. Furthermore, to enable AF relaying, one or both of the BS and the hUE may perform cross-layer scheduling so that a media access control (MAC) of the BS or the hUE can directly control the physical layer (PHY) resource allocation for the wUE.

Figure 10:
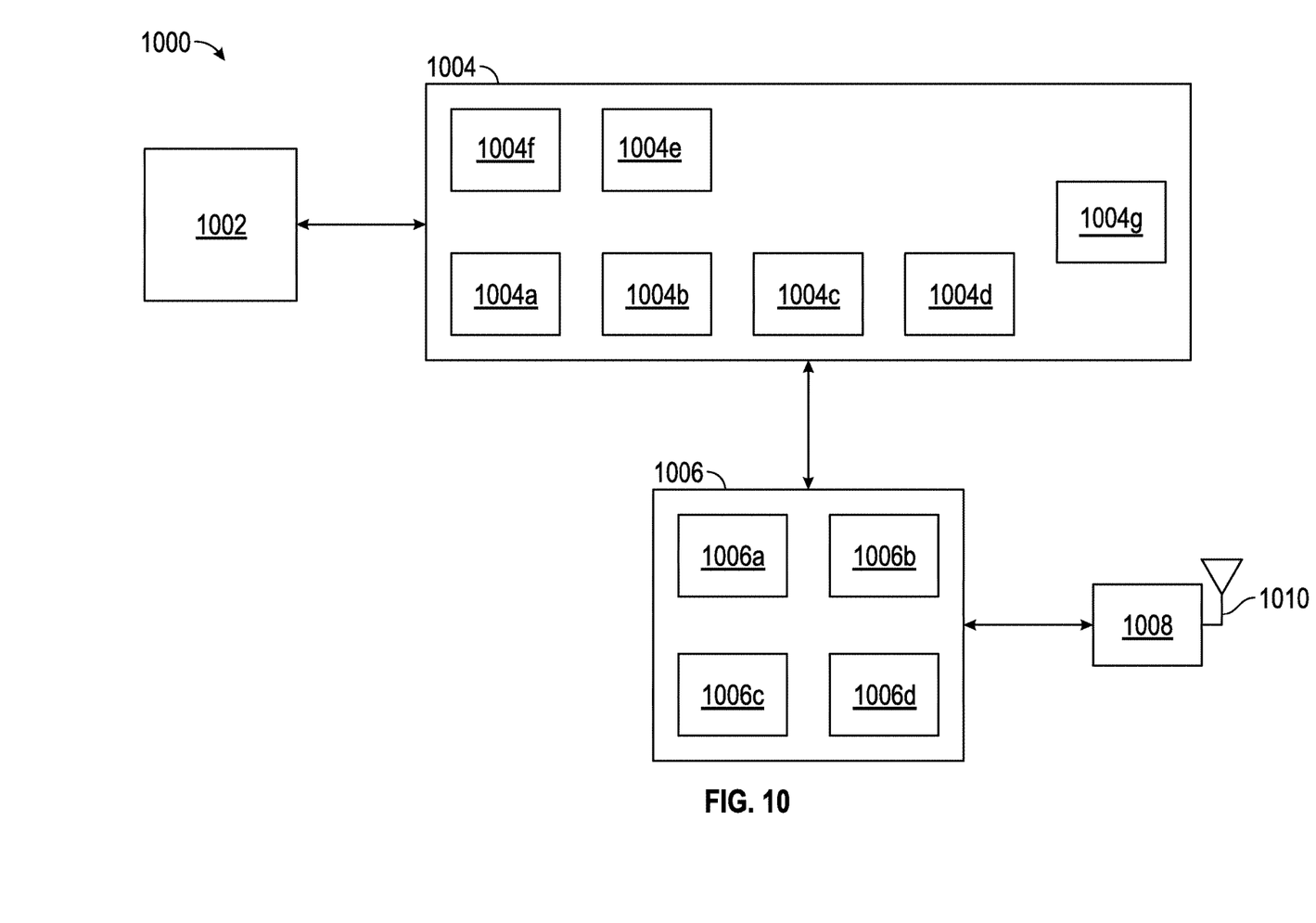
FIG. 10 illustrates components of an electronic device in accordance with some embodiments.

FIG. 10 illustrates, for an example embodiment, components of an electronic device 1000. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. In some embodiments, the electronic device 1000 may be, implement, be incorporated into, or otherwise be a part of a user equipment (UE), an evolved NodeB (eNB), and/or another like network element. In some embodiments, the electronic device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006.

For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), preceding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments.

The baseband circuitry 1004 may further include memory/storage 1004g. The memory/storage 1004g may be used to load and store data and/or instructions for operations performed by the processors of the baseband circuitry 1004. Memory/storage for one embodiment may include any combination of suitable volatile memory and/or non-volatile memory. The memory/storage 1004g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1004g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing.

In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect. In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006. In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the electronic device 1000 may include additional elements such as, for example, memory/storage, display, camera, sensor, and/or input/output (I/O) interface.

Figure 11:
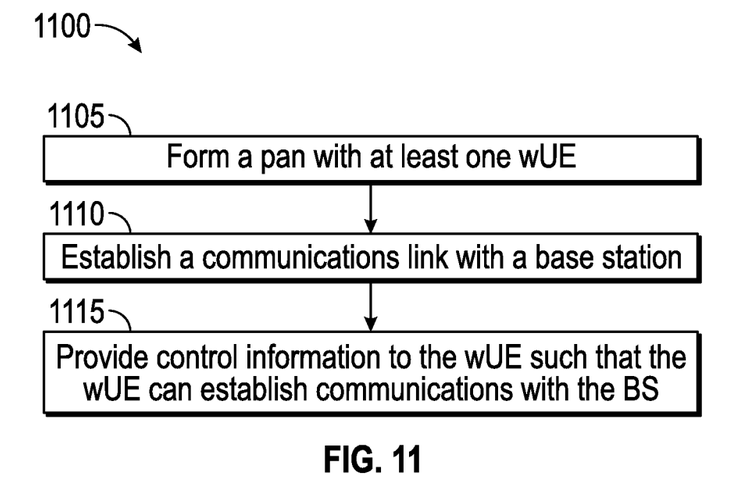
FIG. 11 is a flow diagram of an example of a method performable by the electronic device of FIG. 10 in accordance with some embodiments.

FIG. 11 is a flow diagram of an embodiment of a method 1100 performable by the electronic device of FIG. 10. In embodiments where the electronic device is, implements, is incorporated into, or is otherwise part of a header user equipment (hUE), or a portion thereof, the method may include, forming a personal area network (PAN) with a wearable user equipment (wUE) at 1105, establishing a communications link with a base station (BS) at 1110, and providing control information to the wUE such that the wUE can establish communications with the BS at 1115. In some embodiments, the PAN appears to the BS as single device with a shared cellular radio network a cellular temporary network identifier (C-RNTI) or a same PAN-identifier (ID). In some embodiments, the method may include obtaining the C-RNTI or the PAN-ID during a random access procedure; and providing, by the hUE, the C-RNTI to the wUE.

In some embodiments, communications between the hUE and the wUE is by way of a Pu interface, communication between the hUE and the BS is by way of a Uu-p interface, and communication between the wUE and the BS is by way of a Uu-w interface. In some embodiments, the method may include managing control-plane signaling between the BS and the wUE; and managing user-plane signaling and between the BS and the wUE. In some embodiments, the method may include managing an access process and a registration process of the wUE to a wireless network associated with the BS. In some embodiments, the wUE may listen for a synchronization signal and system information broadcast from the BS.

In some embodiments, the synchronization signal is to indicate that when a downlink (DL) resource of a cellular network is allocated for intra-PAN DL communication and a propagation time difference from the BS to the hUE and the wUE is less than or equal to a cyclic prefix (CP) duration, the wUE is to use a hUE DL timing as a single synchronization source; when the DL resource of the cellular network is allocated for the intra-PAN DL communication and the propagation time difference from the BS to the hUE and the wUE is greater than the CP duration, the wUE is to use the hUE DL timing as synchronization source for the intra-PAN communication and a BS timing as a synchronization source for communication with the BS; and when an uplink (UL) resource of the cellular network is allocated for the intra-PAN DL communication, the wUE is to use a hUE UL timing as synchronization source for the intra-PAN communication and the BS timing as the synchronization source for communication with the BS.

In some embodiments, the method may include receiving, by the hUE, a message from the wUE that is indicative of a random access procedure performed by the wUE to join the PAN; authenticating, by the hUE, the wUE for the wUE to access to the PAN; establishing, by the hUE, a secure connection for the wUE with the hUE when the wUE is properly authenticated; and providing, by the hUE, a registration message to a core network element to indicate that the wUE has been attached to the PAN, wherein the wUE is to provide the message from the wUE after the wUE performs a synchronization operation to synchronize with a BS timing. The core network element may be a mobility management entity (MME). In some embodiments, the method may include obtaining, by the hUE, uplink traffic and feedback information from the wUE, and providing the uplink traffic to the BS.

In some embodiments, the method may include managing, by the hUE, communication between the BS and the wUE, wherein the managing comprises providing transmissions from the BS to the wUE and providing transmissions from the wUE to the BS. In some embodiments, the wUE is to be addressed by an internet protocol (IP) port number or a bearer ID, or wherein a subgroup ID is used to address the wUE. In some embodiments, the method may include reporting, by the hUE, a channel quality indicator (CQI) to the BS based on the condition of a first link between the hUE and the BS, a second link between the hUE and the wUE, and a third link between the wUE and the BS. In some embodiments, the method may include receiving, by the hUE, a data transmission from the BS, and sending, by the hUE, a control message to the wUE to enable reception of the data transmission by the wUE.

In some embodiments, the hUE includes three transmission modes including: i) a default mode in which all communications between the BS and the wUE go through the hUE, and there is no direct communication between the BS and the wUE; ii) a rate-enhanced mode in which a direct link between the BS and the wUE is provided for downlink transmissions, wUE hybrid automatic repeat request (HARQ) feedback is provided to the hUE, and when the HARQ feedback includes a negative acknowledgement (NACK), the hUE is to perform a retransmission; and iii) a low-latency mode in which the hUE is to act as an amplify-and-forward (AF) relay. To enable the AF relaying, one of the BS and the hUE may perform cross-layer scheduling so that a media access control (MAC) can directly control the physical layer (PHY) resource allocation for the wUE.

Figure 12:
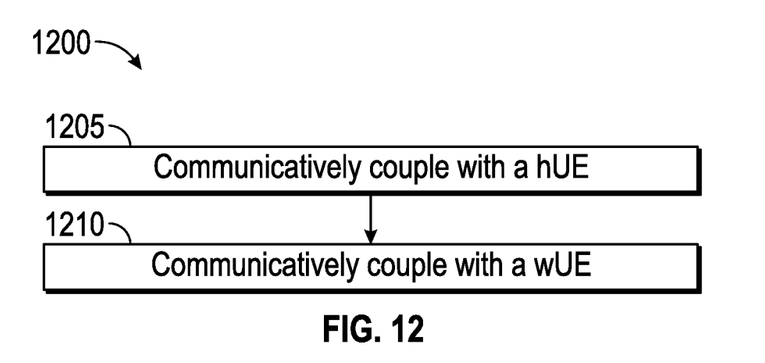
FIG. 12 is a flow diagram of another example of a method performable by the electronic device of FIG. 10 in accordance with some embodiments.

FIG. 12 is a flow diagram of another embodiment of a method 1200 performable by the electronic device of FIG. 10. In embodiments where the electronic device is, implements, is incorporated into, or is otherwise part of an evolved node B (eNB), or a portion thereof, the process may include communicatively coupling, by the eNB, with a wearable user equipment (wUE) via a first link at 1205, and communicatively coupling, by the eNB, with a header user equipment (hUE) via a second link at 1210. The hUE and the wUE may form a personal area network (PAN). In some embodiments, the method may include obtaining, by the eNB, a shared cellular radio network a cellular temporary network identifier (C-RNTI) or a single PAN-identifier (ID) such that the PAN appears as a single device to the eNB. In some embodiments, the method may include providing, by the eNB, the C-RNTI or the PAN-ID to the hUE during a random access procedure and wherein the C-RNTI is to be broadcast to the wUE. In some embodiments, the first link is a Uu-w interface, the second link is a Uu-p interface, a third link between the eNB and a core network element is a S1 interface, and wherein a fourth link between the wUE and the hUE is a Pu interface.

In some embodiments, the method may include broadcasting, by the eNB, a synchronization signal and system information to the wUE. In some embodiments, the synchronization signal is to indicate that when a downlink (DL)

resource of a cellular network is allocated for intra-PAN DL communication and a propagation time difference from the BS to the hUE and the wUE is less than or equal to a cyclic prefix (CP) duration, the wUE is to use a hUE DL timing as a single synchronization source. When the DL resource of the cellular network is allocated for the intra-PAN DL communication and the propagation time difference from the BS to the hUE and the wUE is greater than the CP duration, the wUE is to use the hUE DL timing as synchronization source for the intra-PAN communication and a BS timing as a synchronization source for communication with the BS. When an uplink (UL) resource of the cellular network is allocated for the intra-PAN DL communication, the wUE is to use a hUE UL timing as synchronization source for the intra-PAN communication and the BS timing as the synchronization source for communication with the BS.

In some embodiments, the method may include obtaining, by the eNB, uplink traffic and feedback information from the hUE, wherein the hUE is to obtain the uplink traffic and the feedback information from the wUE. In some embodiments, the method may include providing, by the eNB, transmissions to the wUE via the hUE; and obtaining, by the eNB, transmissions from the wUE via the hUE. In some embodiments, the wUE is to be addressed by an internet protocol (IP) port number or a bearer ID. In some variations, a subgroup ID may be used to address the wUE. In some embodiments, the method may include obtaining, by the eNB, a channel quality indicator (CQI) based on the condition of the first link, second link, and a third link between the wUE and the hUE. In some embodiments, the method may include providing, by the eNB, a data transmission to the hUE, wherein the hUE is to send a control message to the wUE to enable reception of the data transmission by the wUE.

In some embodiments, the hUE includes three transmission modes comprising i) a default mode wherein all communications between the BS and the wUE go through the hUE, and there is no direct communication between the BS and the wUE; ii) a rate-enhanced mode in which a direct link between the BS and the wUE is provided for downlink transmissions, wUE hybrid automatic repeat request (HARQ) feedback is provided to the hUE, and when the HARQ feedback includes a negative acknowledgement (NACK), the hUE is to perform a retransmission; and iii) a low-latency mode wherein the hUE is to act as an amplify-and-forward (AF) relay, wherein to enable AF relaying, one of the BS and the hUE are to perform cross-layer scheduling so that a media access control (MAC) can directly control the physical layer (PHY) resource allocation for the wUE.

Figure 13:
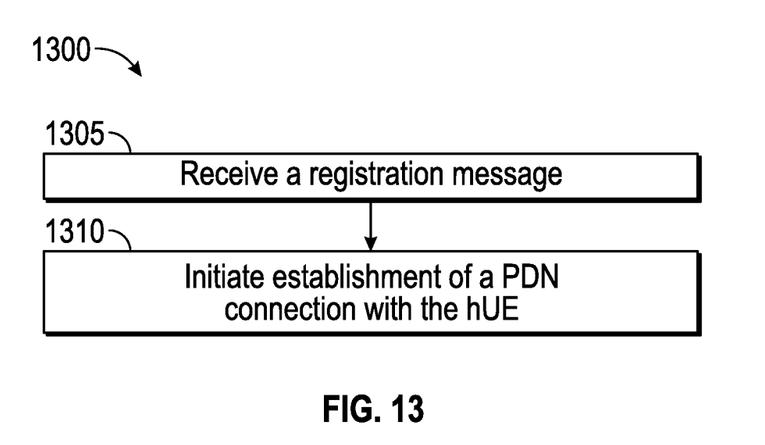
FIG. 13 is a flow diagram of another example of a method performable by the electronic device of FIG. 10 in accordance with some embodiments.

FIG. 13 is a flow diagram of another example embodiment of a method performable by the electronic device of FIG. 10. In some embodiments where the electronic device is, implements, is incorporated into, or is otherwise part of mobility management entity (MME), or a portion thereof, the process may include at 1305 receiving, by the MME, a registration message to indicate authentication of a wearable user equipment (wUE) within a personal area network (PAN) comprising the wUE and a header user equipment (hUE); and initiating, by the MME at 1310, establishment of a packet data network (PDN) connection with the hUE in response to receipt of the registration message. In some embodiments, the registration message is obtained over an S1 interface, and wherein the hUE is to communicatively couple with the wUE via a Pu interface, communicatively couple with an evolved node B (eNB) via a Uu-p interface, and the wUE is to communicatively couple with the eNB via a Uu-w. In some embodiments, the PAN appears to the eNB as single device with a shared cellular radio network a cellular temporary network identifier (C-RNTI) or a same PAN-identifier (ID). In some embodiments, the eNB is to obtain the C-RNTI or the PAN-ID during a random access procedure and broadcast the C-RNTI to the wUE.

In some embodiments, receipt of the registration message is based on reception of another message from the wUE that is indicative of a random access procedure performed by the wUE to join the PAN; an authentication procedure performed by the hUE for the wUE to access to the PAN; and establishment of a secure connection for the wUE with the hUE when the wUE is properly authenticated. In some embodiments, the registration message may be received during a non-access stratum (NAS) signaling procedure or the registration message may be contained within a NAS message.

The several embodiments described herein provide energy efficient network connectivity for wearable smart devices. The method, device, and system embodiments support diverse types of network traffic and meet QoS requirements even in a densely populated environment.

ADDITIONAL DESCRIPTION AND EXAMPLES

Example 1 includes subject matter (such as an apparatus of user equipment (UE)) comprising transceiver circuitry configured to transmit and receive radio frequency electrical signals to communicate with one or more separate devices via a cellular communication network as UE and to communicate with one or more separate devices via a wireless personal area network (PAN) as PAN header UE (hUE); and processing circuitry configured to: receive a packetized message directly from a second UE via the PAN, wherein the packetized message indicates an enhanced node B (eNB) of the cellular network as a destination for the packetized message; and initiate transmission of the packetized message to the eNB.

In Example 2, the subject matter of Example 1 optionally includes transceiver circuitry configured to decode a random access message transmitted by the second UE via the PAN and transmit a random access response message to the second UE, wherein the random access response message includes one or both of a cell radio network temporary identifier (C-RNTI) of the hUE and an identifier for the PAN (PAN-ID).

In Example 3, the subject matter of one or both of Examples 1 and 2 optionally includes transceiver circuitry is configured to: receive a message from the eNB; receive a negative acknowledge (NACK) message from the second UE; and initiate transmission of information included in the message received from the eNB to the second UE via the PAN.

In Example 4, the subject matter of one or any combination of Examples 1-3 optionally includes processing circuitry is configured to: decode a message detected on a first resource of the cellular network indicating the second UE as a destination; and initiate retransmission of information included in the message to the second UE using a second resource of the cellular network.

In Example 5, the subject matter of one or any combination of Examples 1-4 optionally includes processing circuitry is configured to initiate transmission of a message to the eNB that includes channel quality indicators (CQI) according to channel quality of the eNB-to-UE link and at least one of the UE-to-second UE link and the eNB-to-second UE link.

In Example 6, the subject matter of one or any combination of Examples 1-5 optionally includes processing circuitry is configured to communicate control plane signals for the PAN with the eNB.

In Example 7, the subject matter of one or any combination of Examples 1-6 optionally includes one or more antennas electrically connected to the transceiver circuitry.

In Example 8, the subject matter of one or any combination of Examples 1-7 optionally includes transceiver circuitry configured to communicate with devices in the PAN over a range less than ten meters and communicates via the PAN using a PAN frequency band different from a frequency band of the cellular network.

Example 9 can include subject matter (such as an apparatus of UE), or can optionally be combined with the subject matter of one or any combination of Examples 1-8 to include such subject matter, comprising transceiver circuitry configured to receive radio frequency electrical signals from an enhanced node B (eNB) via a cellular communication network and configured to transmit and receive radio frequency electrical signals to communicate directly via a wireless personal area network (PAN) with a separate PAN header UE (hUE); and processing circuitry configured to initiate transmission of a packetized message to the hUE via the PAN, wherein the packetized message indicates the eNB as a destination for the packetized message.

In Example 10, the subject matter of Example 9 optionally includes transceiver circuitry configured to: detect downlink transmissions to the hUE; and synchronize communication via the PAN using downlink timing of the hUE.

In Example 11, the subject matter of Example 10 optionally includes transceiver circuitry configured to: detect transmissions from the eNB; and synchronize communication via the cellular network using one of the downlink timing of the hUE or timing of the eNB.

In Example 12, the subject matter of one or any combination of Examples 9-11 optionally includes transceiver circuitry configured to: detect uplink transmissions to the hUE and detect transmissions from the eNB; and synchronize communication via the cellular network using one of the uplink timing of the hUE or timing of the eNB.

In Example 13, the subject matter of one or any combination of Examples 9-12 optionally includes transceiver circuitry configured to: transmit radio frequency electrical signals using a frequency range different from a frequency range of the cellular network; and communicate information to the eNB by relaying the information to the hUE.

In Example 14, the subject matter of one or any combination of Examples 9-13 optionally includes processing circuitry configured to: decode a system information message transmitted by the hUE; initiate transmission of a random access message to the hUE; and decode a random access response message transmitted by the hUE.

In Example 15, the subject matter of Example 14 optionally includes processing circuitry configured to decode a random access response message transmitted by the hUE that includes a PAN subgroup identifier for the UE.

In Example 16, the subject matter of one or any combination of Examples 9-15 optionally includes processing circuitry configured to: detect an error in a message received from the eNB; and transmit a negative acknowledge (NACK) message to the hUE; and wherein the physical layer circuitry is configured to receive information included in the message from the eNB via the PAN.

In Example 17, the subject matter of one or any combination of Examples 9-16 optionally includes the UE being a wearable UE (wUE).

In Example 18, the subject matter of one or any combination of Examples 9-17 optionally includes one or more antennas electrically connected to the transceiver circuitry.

In Example 19, the subject matter of one or any combination of Examples 9-18 optionally includes transceiver circuitry configured to communicate with devices in the PAN over a range less than ten meters and communicates via the PAN using a PAN frequency band different from a frequency band of the cellular network.

Example 20 includes subject matter (such as a method, a means for performing acts, or a computer readable storage medium including instructions that, when executed by baseband processing circuitry of user equipment (UE) of a cellular communication network, cause the UE to perform acts), or can optionally be combined with the subject matter of one or any combination of Examples 1-19 to include such subject matter, comprising receiving radio frequency electrical signals from an enhanced node B (eNB) via the cellular communication network; transmitting and receive radio frequency electrical signals to communicate directly via a wireless personal area network (PAN) with a separate PAN header UE (hUE); detecting downlink transmissions to the hUE; synchronizing communication via the PAN using downlink timing of the hUE; and initiating transmission of a packetized message to the hUE via the PAN, wherein the packetized message indicates the eNB as a destination for the packetized message.

In Example 21, the subject matter of Example 20 optionally includes detecting transmissions from the eNB, and synchronizing communication via the cellular network using one of the downlink timing of the hUE or timing of the eNB.

In Example 22, the subject matter of one or both of Examples 20 and 21 optionally includes detecting uplink transmissions to the hUE and detect transmissions from the eNB, and synchronizing communication via the cellular network using one of the uplink timing of the hUE or timing of the eNB.

In Example 23, the subject matter of one or any combination of Examples 20-22 optionally includes decodinf a message detected on a first resource of the cellular network indicating the second UE as a destination, and initiating retransmission of information included in the message to the second UE using a second resource of the cellular network.

In Example 24, the subject matter of one or any combination of Examples 20-23 optionally includes decoding a system information message transmitted by the hUE; initiating transmission of a random access message to the hUE; and decoding a random access response message transmitted by the hUE.

In Example 25, the subject matter of one or any combination of Examples 20-24 optionally includes detecting an error in a message received from the eNB; transmitting a negative acknowledge (NACK) message to the hUE; and receiving information included in the message from the eNB via the PAN.

These non-limiting Examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions that when executed are operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus of user equipment (UE), the apparatus comprising:
    transceiver circuitry configured to transmit and receive radio frequency electrical signals to communicate with one or more separate devices via a cellular communication network as UE and to communicate with one or more separate devices via a wireless personal area network (PAN) as PAN header UE (hUE); and
    processing circuitry configured to:
    receive a packetized message directly from a second UE via the PAN, wherein the packetized message indicates an enhanced node B (eNB) of the cellular network as a destination for the packetized message;
    initiate transmission of the packetized message to the eNB;
    decode a random access message transmitted by the second UE via the PAN;
    initiate transmission of a random access response message to the second UE, wherein the random access response message includes one or both of a cell radio network temporary identifier (C-RNTI) of the hUE and an identifier for the PAN (PAN-ID).

2. The apparatus of claim 1, wherein the transceiver circuitry is configured to: receive a message from the eNB; receive a negative acknowledge (NACK) message from the second UE; and initiate transmission of information included in the message received from the eNB to the second UE via the PAN.

3. The apparatus of claim 1, wherein the processing circuitry is configured to: decode a message detected on a first resource of the cellular network indicating the second UE as a destination; and initiate retransmission of information included in the message to the second UE using a second resource of the cellular network.

4. The apparatus of claim 1, wherein the processing circuitry is configured to initiate transmission of a message to the eNB that includes channel quality indicators (CQI) according to channel quality of the eNB-to-UE link and at least one of the UE-to-second UE link and the eNB-to-second UE link.

5. The apparatus of claim 1, wherein the processing circuitry is configured to communicate control plane signals for the PAN with the eNB.

6. The apparatus of claim 1, including one or more antennas electrically connected to the transceiver circuitry.

7. The apparatus of claim 1, wherein the transceiver circuitry is configured to communicate with devices in the PAN over a range less than 10 meters and communicates via the PAN using a PAN frequency band different from a frequency band of the cellular network.

8. An apparatus of user equipment (UE), the apparatus comprising:
    transceiver circuitry configured to receive radio frequency electrical signals from an enhanced node B (eNB) via a cellular communication network and configured to transmit and receive radio frequency electrical signals to communicate directly via a wireless personal area network (PAN) with a separate PAN header UE (hUE); and
    processing circuitry configured to:
    initiate transmission of a packetized message to the hUE via the PAN, wherein the packetized message indicates the eNB as a destination for the packetized message;
    decode a system information message transmitted by the hUE;
    initiate transmission of a random access message to the hUE; and
    decode a random access response message transmitted by the hUE.

9. The apparatus of claim 8, wherein the transceiver circuitry is configured to: detect downlink transmissions to the hUE; and synchronize communication via the PAN using downlink timing of the hUE.

10. The apparatus of claim 9, wherein the transceiver circuitry is configured to: detect transmissions from the eNB; and synchronize communication via the cellular network using one of the downlink timing of the hUE or timing of the eNB.

11. The apparatus of claim 8, wherein the transceiver circuitry is configured to: detect uplink transmissions to the hUE and detect transmissions from the eNB; and synchronize communication via the cellular network using one of the uplink timing of the hUE or timing of the eNB.

12. The apparatus of claim 8, wherein the transceiver circuitry is configured to: transmit radio frequency electrical signals using a frequency range different from a frequency range of the cellular network; and communicate information to the eNB by relaying the information to the hUE.

13. The apparatus of claim 8, wherein the random access response message transmitted by the hUE includes a PAN subgroup identifier for the UE.

14. The apparatus of claim 8, wherein the processing circuitry is configured to: detect an error in a message received from the eNB; and transmit a negative acknowledge (NACK) message to the hUE; and wherein the physical layer circuitry is configured to receive information included in the message from the eNB via the PAN.

15. The apparatus of claim 8, wherein the UE is a wearable UE (wUE).

16. The apparatus of claim 8, including one or more antennas electrically connected to the transceiver circuitry.

17. The apparatus of claim 8, wherein the transceiver circuitry communicates with devices in the PAN over a range less than ten meters and communicates via the PAN using a PAN frequency band different from a frequency band of the cellular network.

18. A non-transitory computer readable storage medium including instructions that, when executed by baseband processing circuitry of user equipment (UE) of a cellular communication network, cause the UE to:
   receive radio frequency electrical signals from an enhanced node B (eNB) via the cellular communication network;
   transmit and receive radio frequency electrical signals to communicate directly via a wireless personal area network (PAN) with a separate PAN header UE (hUE);
   detect downlink transmissions to the hUE;
   synchronize communication via the PAN using downlink timing of the hUE;
   initiate transmission of a packetized message to the hUE via the PAN, wherein the packetized message indicates the eNB as a destination for the packetized message;
   decode a system information message transmitted by the hUE;
   initiate transmission of a random access message to the hUE; and
   decode a random access response message transmitted by the hUE.

19. The non-transitory computer readable storage medium of claim 18, including instructions that, when executed by baseband processing circuitry of a UE cause the UE to detect transmissions from the eNB, and synchronize communication via the cellular network using one of the downlink timing of the hUE or timing of the eNB.

20. The non-transitory computer readable storage medium of claim 18, including instructions that, when executed by baseband processing circuitry of a UE cause the UE to detect uplink transmissions to the hUE and detect transmissions from the eNB, and synchronize communication via the cellular network using one of the uplink timing of the hUE or timing of the eNB.

21. The non-transitory computer readable storage medium of claim 18, including instructions that, when executed by baseband processing circuitry of a UE cause the UE to decode a message detected on a first resource of the cellular network indicating the second UE as a destination, and initiate retransmission of information included in the message to the second UE using a second resource of the cellular network.

22. The non-transitory computer readable storage medium of claim 18, including instructions that, when executed by baseband processing circuitry of a UE cause the UE to: detect an error in a message received from the eNB; and transmit a negative acknowledge (NACK) message to the hUE; and wherein the physical layer circuitry is configured to receive information included in the message from the eNB via the PAN.

* * * * *